Figure 1:
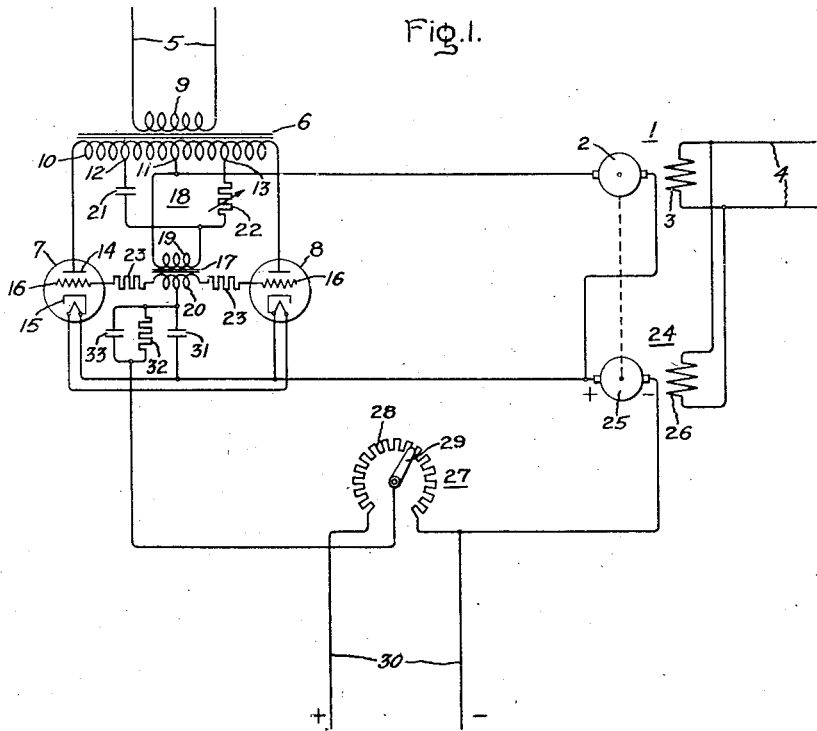

Dec. 23, 1941.　　　G. W. GARMAN　　　2,267,404

ELECTRIC CONTROL SYSTEM

Original Filed Nov. 24, 1937　　　3 Sheets-Sheet 1

Inventor:
George W. Garman,
by Harry E. Dunham
His Attorney.

Dec. 23, 1941.  G. W. GARMAN  2,267,404
ELECTRIC CONTROL SYSTEM
Original Filed Nov. 24, 1937   3 Sheets-Sheet 2
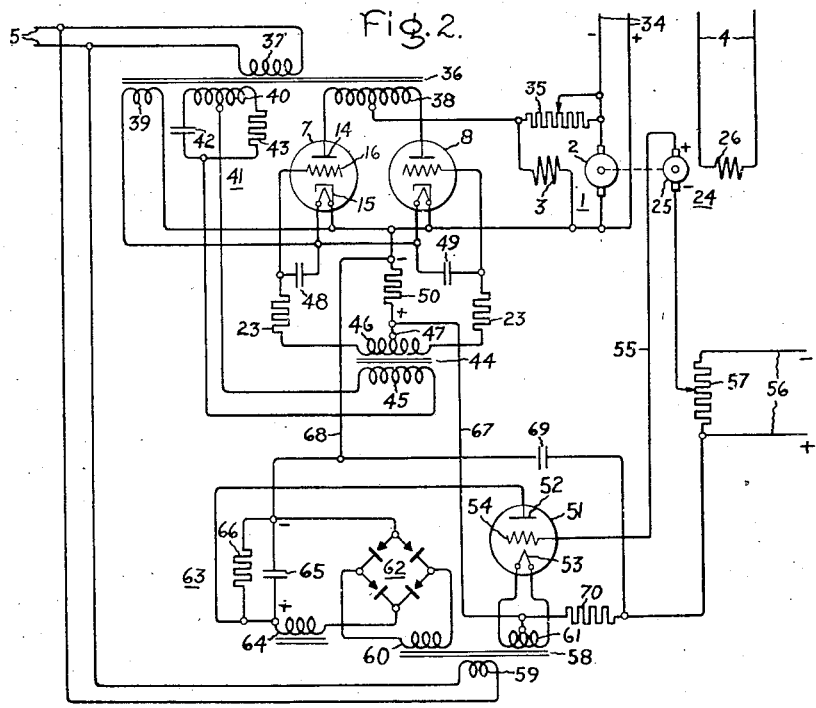
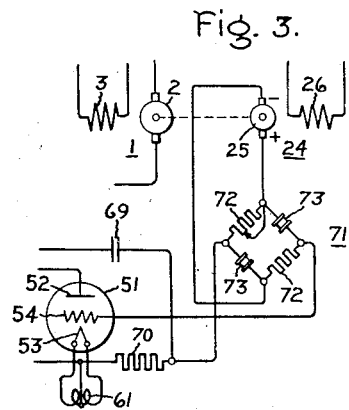
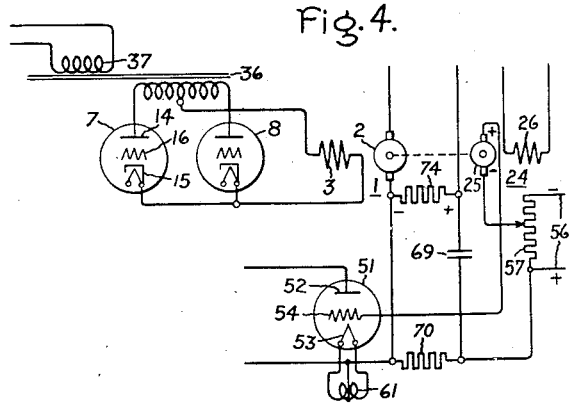
Inventor
George W. Garman,
by Harry E. Dunham
His Attorney.

Dec. 23, 1941.  G. W. GARMAN  2,267,404
ELECTRIC CONTROL SYSTEM
Original Filed Nov. 24, 1937   3 Sheets-Sheet 3
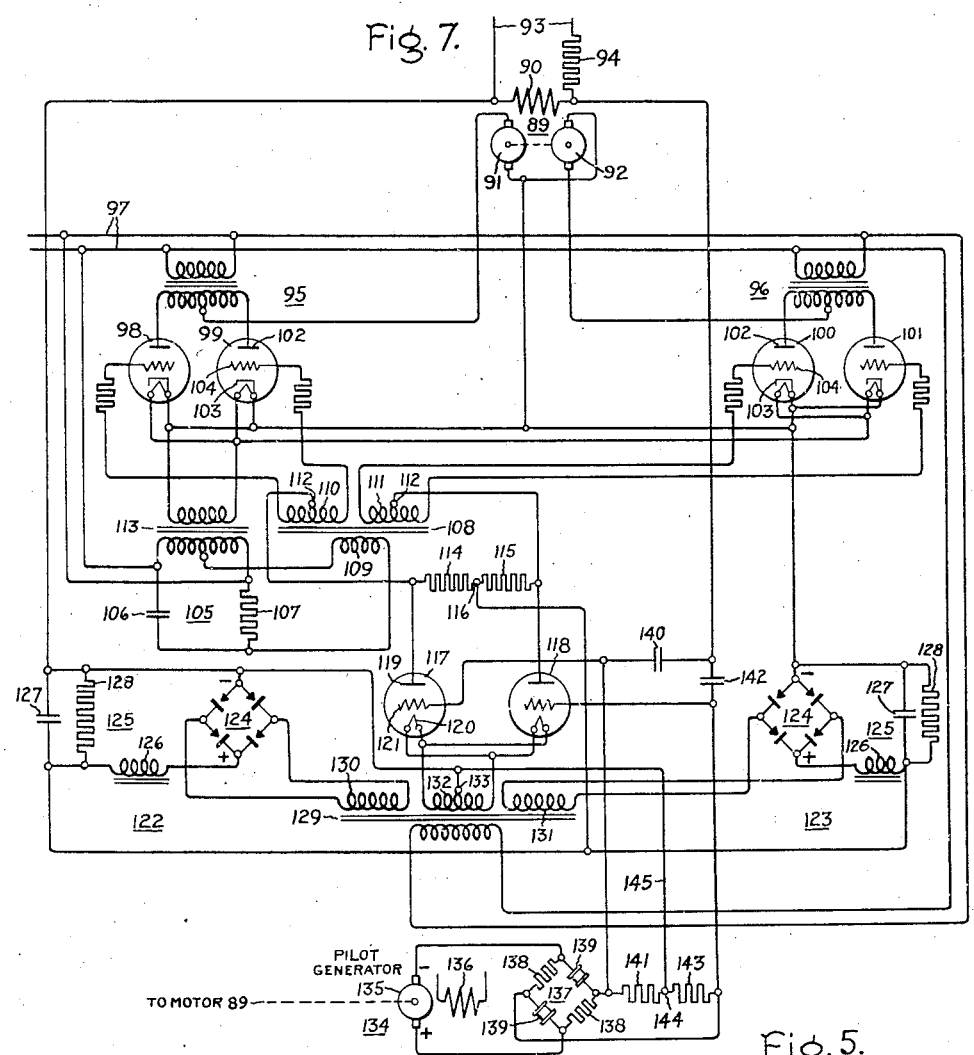
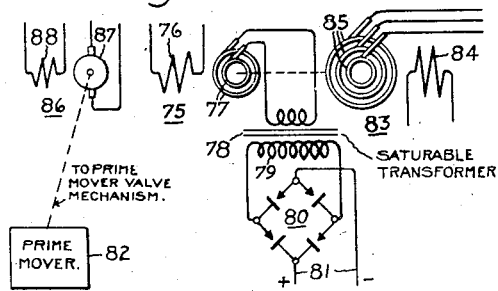
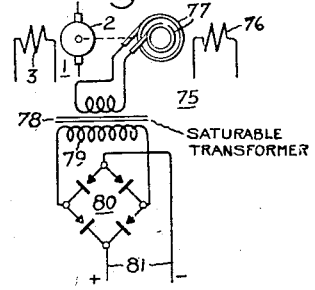
Inventor:
George W. Garman,
by Harry E. Dunham
His Attorney.

Patented Dec. 23, 1941

2,267,404

UNITED STATES PATENT OFFICE 2,267,404

ELECTRIC CONTROL SYSTEM

George W. Garman, Schenectady, N. Y., assignor to General Electric Company, a corporation of New York Original application November 24, 1937, Serial No. 176,281. Divided and this application May 31, 1940, Serial No. 338,007

4 Claims. (Cl. 172—239)

My invention relates to electric control systems and more particularly to electric valve control systems for dynamo-electric machines.

This application is a division of my copending application Serial No. 176,281, filed May 24, 1937, now Patent No. 2,229,448, Jan. 21, 1941, and which is assigned to the assignee of the present application.

In many industrial operations or processes it is frequently desirable to control an operation by means of an electric motor the speed of which is precisely and accurately determinable. For example, in many applications it is desirable to energize a direct current motor from an associated alternating current circuit through electric valve means and to maintain the speed of the motor at a definite predetermined speed. Heretofore many of the prior art arrangements which have been employed for this purpose have entailed the use of complicated and expensive control equipment and have been susceptible to objectionable variations in speed. Furthermore, it has become desirable to provide control apparatus which is entirely electrical in nature and operation and which is free of moving or vibrating contacts. In addition, it is important in order to obtain precise control to dispense with the use of mechanical speed responsive devices because of the inherent limitations of such arrangements.

It is an object of my invention to provide a new and improved electric control system.

It is another object of my invention to provide a new and improved electric valve control system for dynamo-electric machines.

It is a further object of my invention to provide a new and improved control system for electric valve translating apparatus for controlling the speed of a direct current motor.

Briefly stated, on one of the illustrated embodiments of my invention I provide a control system for dynamo-electric machines, such as direct current motors, in which a bridge circuit is connected between a pilot generator and control electric valves which determine an operating condition, such as the speed of the motor to be controlled. Suitable anti-hunting or damping circuits are connected between the bridge circuit and the electric valves or electronic discharge devices which control the energization of the motor. The direct current pilot generator which is responsive to a predetermined controlling influence such as the speed of the motor, is connected to the bridge circuit, and the bridge circuit accentuates the voltage variations of the pilot generator to obtain precise and accurate control of the motor speed.

In another modification of this aspect of my invention, a dynamo-electric machine of the direct current type, such as a direct current motor, is provided with a field winding and a pair of armature circuits so that the motor may be rotated in either direction. A pair of rectifying circuits are associated with the respective armature circuits and the conductivity of these rectifying circuits is controlled in response to a predetermined controlling influence, such as the speed of the motor. A pair of electronic discharge devices is provided to control the conductivity of the electric valves in the rectifying circuits. A bridge circuit including nonlinear elements is connected to be responsive to the output voltage of a direct current pilot generator, and anti-hunting or damping circuits are connected between the output circuit of the bridge and the input or grid circuits of the electronic discharge devices.

For a better understanding of my invention, reference may be had to the following description taken in connection with the accompanying drawings, and its scope will be pointed out in the appended claims. Fig. 1 diagrammatically illustrates an embodiment of my invention as applied to a control system for a dynamo-electric machine of the direct current type and in which a pilot generator is connected directly in circuit with the control members of the power electric valves; Fig. 2 illustrates an embodiment of my invention employing an intermediate control electric valve between the pilot generator and the main or power electric valves; and Figs. 3–6 represent certain modifications thereof. Fig. 7 diagrammatically illustrates another embodiment of my invention as applied to a control system for a direct current motor arranged for operation in both directions of rotation.

Referring now to Fig. 1 of the drawings, my invention is diagrammatically illustrated as applied to an electric valve control system for a dynamo-electric machine 1 of the direct current type having an armature 2 and a field winding 3. The field winding 3 may be energized from any suitable source of direct current 4. Armature 2 of machine 1 is energized from an alternating current circuit 5 through a transformer 6 and through electric valves 7 and 8. The transformer 6 comprises a primary winding 9 and a secondary winding 10 provided with electrically intermediate connections 11, 12 and 13. The electric valves 7 and 8 are preferably of the type employing an ionizable medium such as a gas or a vapor and each comprises an anode 14, a cathode 15 and a control means or member 16. One terminal of the direct current armature 2 of machine 1 is connected to the intermediate connection 11 of secondary winding 10, and the other terminal thereof is connected to the common connection of cathodes 15 of electric valves 7 and 8.

To impress on control members 16 of electric valves 7 and 8 alternating voltages of predetermined phase displaced relative to the respective anode voltages, I employ an excitation circuit including a transformer 17 energized from secondary winding 10 of transformer 6 through a suitable phase shifting circuit 18. The transformer 17 is provided with a primary winding 19 and a secondary winding 20. The phase shifting circuit 18 may comprise a capacitance 21 and a variable resistance 22 having terminals connected to intermediate connections 12 and 13, respectively, of secondary winding 10 of transformer 6. Primary winding 19 of transformer 17 is connected to the common juncture of capacitance 21 and resistance 22 and intermediate connection 11 of secondary winding 10. Current limiting resistances 23 may be connected in series relation with control members 16 of electric valves 7 and 8.

As an agency for controlling the phase of the resultant voltages impressed on control members 16 of electric valves 7 and 8 in accordance with a predetermined controlling influence derived from the dynamo-electric machine 1, I employ a voltage source variable in accordance with the condition to be controlled such as an auxiliary dynamo-electric machine 24 which may be termed a pilot generator. The pilot generator 24 may be of the direct current type having an armature member 25 and a field winding 26 which may be energized from any suitable source of direct current, and which is shown as being connected to the direct current circuit 4. I provide a voltage divider 27, comprising a resistance 28 and an adjustable contact 29, for producing a variable or adjustable source of reference potential against which the output voltage of the pilot generator 24 acts. The voltage divider 27 may be energized from any suitable source of unidirectional voltage 30. It will be noted that the voltage of the voltage divider 27 and the voltage of the pilot generator 24 act in opposition to introduce in the excitation circuit for electric valves 7 and 8 a resultant unidirectional voltage which varies in accordance with the speed of the dynamo-electric machine 1.

In order to control the rate of change of the difference voltage provided by pilot generator 24 and voltage divider 27 and hence to control the rate of change of potential of control members 16, I provide a serially connected capacitance 31 and a resistance 32 which are connected in series relation with the voltage divider 27 and armature 25 of pilot generator 24. Capacitance 31 and resistance 32 serve as a damping means for great variations in speed of the machine 1. In order to provide a means for permitting precise and accurate control of the speed of machine 1 in accordance with small variations in speed thereof, I provide a capacitance 33 which is connected in parallel relation with resistance 32. This capacitance permits a rapid rate of change of the potential of control members 16 for small changes in speed of the dynamo-electric machine 1.

Certain aspects of the electric valve control system, including the anti-hunting circuit and the direct current pilot generator, are disclosed and claimed in my above-identified application which is assigned to the assignee of this application.

The operation of the embodiment of my invention shown in Fig. 1 will be explained by considering the system when dynamo-electric machine 1 is operating as a direct current motor. A unidirectional current will be transmitted to the armature 2 of machine 1 through electric valves 7 and 8 which operate as a rectifier energized from the alternating current circuit 5.

The manner in which the electric valves 7 and 8 control the voltage impressed on armature 2 of machine 1 will be well understood by those skilled in the art. For a given positive anode voltage there is a certain value of grid voltage which is termed the critical grid voltage. When the grid is more negative than this value, current cannot flow between anode and cathode. If the grid is more positive than this critical value, current can flow and the magnitude of the current will be determined principally by the external resistance of the associated circuit. Once this current is established between anode and cathode, in the usual commercial arrangement the grid can exert no further control unless the anode voltage is reduced to a value near zero. When the anode voltage becomes zero, the current flow ceases and if the grid is sufficiently negative it can then prevent the current from restarting. Therefore, when a voltage is applied between the cathode and anode, the grid can regain control once during each cycle and can, therefore, be used to prevent current flow when the anode is positive.

Resistance 22 may be adjusted so that the phase of the alternating components of voltage impressed on control members 16 by transformer 17 lag the respective anode voltages by substantially 90 degrees. Voltage divider 27 is adjusted so that the voltage which this element introduced into the excitation circuit is somewhat greater than the negative unidirectional biasing potential provided by pilot generator 24. By the proper adjustment of the voltage divider, the resultant unidirectional voltage impressed on the control members 16 will be positive.

If it be assumed that the speed of the dynamo-electric machine 1 decreases to a value below the predetermined range to be maintained, the voltage produced by the pilot generator 24 will correspondingly decrease to effect an increase in the positive resultant unidirectional voltage impressed on control members 16 of electric valves 7 and 8, thereby effecting a virtual advancement in phase of the resultant voltages impressed on control members 16 and thereby increasing the output voltage of the electric valves 7 and 8 impressed on armature 2 of machine 1. By virtue of this increase in voltage, the speed of the machine 1 will be increased tending to restore it to the predetermined range of operation. On the other hand, if the speed of the machine 1 increases to a value above the predetermined range of operation, the output voltage of pilot generator 21 will increase effecting a decrease in the resultant positive unidirectional voltage impressed on control members 16, causing thereby a virtual retardation in phase of the control member voltages. Because of this retardation in phase of the voltages impressed on control members 16, the speed of machine 1 will be decreased, thereby restoring the speed of machine 1 to the predetermined range of operation.

Capacitance 31 and resistance 32 serve as a damping means to prevent the speed of the machine 1 from overshooting the predetermined range of speed values to be maintained. The damping effect of the capacitance 31 and resistance 32 for large or substantial changes in speed of machine 1 is due to the fact that the charge on the capacitance 31 cannot change instantaneously relative to variations in potentials across its terminals. The capacitance 33, which is connected in shunt relation with resistance 32, permits small variations in voltage to be transmitted to control members 16 of electric valves 7 and 8 and to control these electric valves within narrowly defined ranges of operation. Capacitance 31 and resistance 32, acting in conjunction with capacitance 33, serve to control the conductivities of electric valves 7 and 8 to effect stable operation when the speed of machine 1 is held within narrowly defined limits; capacitance 31 and resistance 32 prevent over-shooting of the limit to be maintained, and capacitance 33 accomplishes the small or fine regulation.

Fig. 2 of the accompanying drawings diagrammatically illustrates another embodiment of my invention for controlling a dynamo-electric machine of the direct current type. The arrangement of Fig. 2 is similar in many respects to that of Fig. 1 and corresponding elements have been assigned like reference numerals. Armature 2 of machine 1 may be energized from any suitable source of direct current 34, and field winding 3 of machine 1 may be connected to the armature circuit of machine 1 through a current controlling device such as an adjustable resistance 35. Electric valves 7 and 8 may be energized from the alternating current circuit 5 through a transformer 36 having a primary winding 37 and a secondary winding 38. The transformer 36 may also be provided with a secondary winding 39 for energizing cathode heating elements for electric valves 7 and 8.

A source of alternating current of predetermined phase displacement for energizing control members 16 of electric valves 7 and 8 may be obtained by utilizing a secondary winding 40 of transformer 36 which energizes any suitable phase shifting circuit 41. The phase shifting circuit 41 may be of the static type, and may include a capacitance 42 and a resistance 43, which energizes a transformer 44 having a primary winding 45 and a secondary winding 46 provided with an electrical intermediate connection 47. Terminals of the secondary winding 46 are connected to control members 16 of electric valves 7 and 8 through current limiting resistances 23. Capacitances 48 and 49 may be connected across control members 16 and cathodes 15 of electric valves 7 and 8 to absorb extraneous transient voltages which may exist in the control circuits.

As an agency for impressing on control members 16 of electric valves 7 and 8 a potential which varies in accordance with a predetermined influence derived from machine 1, I provide a suitable impedance element such as a resistance 50 which is connected between cathodes 15 of valves 7 and 8 and the electrical intermediate connection 47 of transformer winding 46. To transmit variable unidirectional currents through resistance 50 in accordance with the controlling influence, such as the speed of machine 1, I provide an electronic discharge device 51, which is preferably of the high vacuum type, having an anode 52, a cathode 53 and a control means such as a grid 54. The voltage of the pilot generator 24, which varies as the speed of machine 1, is impressed on grid 54 of electronic discharge device 51 through a conductor 55. A suitable source of unidirectional voltage 56 and a voltage divider 57 are connected to produce a source of reference potential which acts in opposition to the voltage provided by armature 25 of pilot generator 24 so that the resultant voltage impressed on grid 54 varies as a difference voltage. While I have chosen to show the source of reference potential as comprising a voltage divider and a direct current source, it is to be understood that I may employ any other suitable arrangement known in the art. As a source of energization for electric discharge device 51, I employ a transformer 58 having a primary winding 59 and secondary windings 60 and 61. Secondary winding 61 is connected to cathode 53 of discharge device 51 to effect energization thereof, and secondary winding 60 is connected to a rectifier 62 and an electrical wave filter 63 to impress a unidirectional voltage across anode 52 and cathode 53. The rectifier 62 may be of the full wave type and may employ elements of the dry surface contact type such as that disclosed and claimed in United States Letters Patent No. 1,640,335, granted August 23, 1927, upon an application of Lars O. Grondahl. The electrical wave filter 63 may comprise an inductance 64, a capacitance 65 and a resistance 66. Cathode 53 of electronic discharge device 51 is connected to the lower terminal of resistance 50 through a conductor 67, and the upper terminal of resistance 50 is connected to the negative terminal of the wave filter 63 through a conductor 68.

As an agency for controlling the rate of change of the voltage impressed on grid 54 of electronic discharge device 51 in accordance with the voltage appearing across the terminals of resistance 50, I provide a damping circuit including a serially connected capacitance 69 and a resistance 70 which are connected to the grid circuit for device 51. This damping circuit is connected to prevent hunting of the control system and affords an arrangement for obtaining precise control of machine 1 during variable load conditions.

The operation of the embodiment of my invention shown in Fig. 2 will be explained by considering the machine 1 when it is operating as a direct current motor. Armature 2 of machine 1 is energized from circuit 34, and field winding 3 of machine 1 is energized primarily through electric valves 7 and 8 which control the speed of machine 1. As will be well understood by those skilled in the art, the average current conducted by electric valves 7 and 8 may be controlled by controlling the phase of the resultant voltage impressed on control members 16. When there is substantial phase coincidence between the voltages impressed on control members 16 and the voltages impressed on the associated anodes, the average current conducted by these electric valves is maximum, and when the control voltages are displaced in the lagging direction by substantially 90 electrical degrees relative to the respective anode voltages the average current of these electric valves is substantially zero when the electric valves are energizing an inductive circuit. Phase shifting circuit 41 impresses on control members 16 of electric valves 7 and 8, through transformer 44, control voltages lagging by 90 electrical degrees the respective anode voltages. The system is arranged so that the positive unidirectional control potential impressed on control members 16 by resistance 50 is of sufficient value to cause electric valves 7 and 8 to transmit the requisite amount of current to maintain the speed of machine 1 at the desired value. Electronic discharge device 51 controls the amount of unidirectional current transmitted to resistance 50, thereby controlling the magnitude of the unidirectional control voltage appearing across its terminals and controlling the conductivities of electric valves 7 and 8 in accordance with the speed of machine 1. Resistance 57 is adjusted so that the resultant voltage impressed on grid 54 of electronic discharge device 51 attains that value which will maintain the speed of machine 1 at the predetermined value under steady load conditions.

If it be assumed that the speed of machine 1 increases to a value above the predetermined value or range to be maintained, the potential impressed on grid 54 of discharge device 51 will become more positive relative to the potential of the cathode 53 to cause the device 51 to supply a larger amount of current to resistance 50, thereby increasing the positive unidirectional potential impressed on control members 16 of electric valves 7 and 8. This increase in positive potential will effect a virtual advancement in phase of the resultant voltages impressed on control members 16, causing the electric valves 7 and 8 to conduct a greater value of average current and thereby increasing the energization of the field winding 3 of machine 1. This increase in energization of field winding 3 will effect a reduction in speed of the machine 1 tending to restore the machine to the predetermined value or range of speed to be maintained.

The manner in which the damping circuit including capacitance 69 and resistance 70 controls the rate of change of the potential of grid 54 to prevent hunting may be described as follows. Under the above assumed conditions, as the conductivity of the discharge device 51 is increased, due to the more positive voltage being impressed on grid 54, the incident increase in voltage appearing across the terminals of resistance 50 is reflected by the flow of current through resistance 70 and capacitance 69, temporarily raising in a positive direction the potential of the cathode 53 relative to the potential of grid 54. This rise in potential is, of course, occasioned by the charging current of capacitance 69 and introduces a compensatory effect which tends to prevent hunting of the system and permits the control arrangement to maintain the speed of machine 1 within narrowly defined limits. While I have explained the operation of the arrangement shown in Fig. 2 for increases in speed of machine 1 above a certain value, it is to be understood, of course, that the arrangement functions in a similar manner for decreases in speed of the machine 1, tending to restore the speed of the machine to the desired value.

Fig. 3 represents another embodiment of my invention similar in many respects to that shown in Fig. 2, and corresponding elements have been assigned like reference numerals. A bridge circuit 71 may be connected between the armature 25 of pilot generator 24 and the grid 54 of electronic discharge device 51 to accentuate the voltage variations occasioned by variations in speed of the machine 1. The bridge circuit 71 may comprise impedance elements such as resistances 72 having linear impedance-current characteristics and may also include impedance elements such as resistances 73 having nonlinear impedance-current characteristics. Resistances 73 may be made of the material disclosed and claimed in United States Letters Patent No. 1,822,742, granted September 8, 1931, upon an application of Karl B. McEachron and assigned to the assignee of the present application.

The operation of the arrangement shown in Fig. 3 is substantially the same as that explained in connection with the embodiment shown in Fig. 2. The bridge circuit 71 accentuates the voltage variations of armature 25 of pilot generator 24 and provides a suitable arrangement for controlling the conductivity of electronic discharge device 51 which in turn controls the unidirectional voltage impressed on control members 16 of electric valves 7 and 8.

In Fig. 4 there is diagrammatically represented a still further embodiment of my invention showing several elements included in the arrangement of Fig. 2, and these elements have been assigned corresponding reference numerals. The damping circuit including capacitance 69 and resistance 70 are connected to be energized in accordance with an electrical condition, such as the current, of the armature circuit 2 of machine 1. A suitable impedance element such as a resistance 74 may be connected in series relation with the armature 2 of machine 1 to produce a voltage which varies in accordance with the armature current. This voltage is introduced into the circuit for grid 54 of discharge device 51 and acts to prevent hunting.

The operation of the embodiment of my invention shown in Fig. 4 is substantially the same as that explained above in connection with Fig. 2. During transient conditions the voltage appearing across the terminals of resistance 74 causes a charging current to flow through a circuit including capacitance 69 and resistance 70, establishing across the terminals of resistance 70 a voltage to modify the potential difference between grid 54 and cathode 53 thereby preventing hunting of machine 1.

Fig. 5 shows another embodiment of my invention in which an alternating current pilot generator 75 is employed to generate an alternating voltage, the frequency of which varies in accordance with the speed of the machine 1. The pilot generator 75 is provided with a field winding 76 and an armature circuit 77. In order to provide a suitable arrangement for producing an alternating voltage of peaked wave form, I provide a saturable transformer 78 having a secondary winding 79. A rectifier 80 is connected across the terminals of secondary winding 79 to produce a unidirectional voltage the magnitude of which varies with the speed of the machine 1. The output terminals 81 of rectifier 80 may be connected to cathode 53 and grid 54 of electronic discharge device 51 shown in Fig. 2.

The arrangement of Fig. 5 also operates to control the speed of machine 1 under varying load conditions. The unidirectional voltage appearing across the terminals 81 of rectifier 80 varies in magnitude in accordance with the frequency of the voltage impressed on transformer 78; therefore, the conductivity of the electronic discharge device 51, shown in Fig. 5, is controlled in accordance with the speed of machine 1 to effect the desired regulating action.

In Fig. 6 there is shown a modification of the embodiment of my invention shown in Fig. 5 as applied to an arrangement for controlling the energy input to a prime mover 82 which drives a generator, such as an alternating current generator 83 having a field winding 84 and an armature circuit 85. The input to prime mover 82 may be controlled by a suitable valve controlling motor 86 having an armature member 87 and a field winding 88. Output terminals 81 of rectifier 80 may be connected to cathode 53 and grid 54 of an electronic discharge device 51, shown in Fig. 2, and the armature and the field winding 88 of the valve motor 86 may be energized from an arrangement similar to that shown in Fig. 2.

In operation the arrangement shown in Fig. 6 performs substantially the same as that explained in connection with Figs. 2 and 5. The frequency of the alternating voltage generated by pilot generator 75 varies in accordance with the speed of the generator 83, and the energization of the valve motor 86 is controlled to maintain the speed and the frequency of the generator 83 at a predetermined value or range of values.

Various aspects of the control system shown in Figs. 5 and 6, including the means for producing a voltage of peaked wave form, are disclosed and claimed in my copending divisional application Serial No. 219,382, filed July 15, 1938.

In Fig. 7 of the accompanying drawings there is shown another embodiment of my invention as applied to a control system for operating a reversible direct current motor. A direct current motor 89 having field winding 90 and armature members 91 and 92 is arranged for operation in either direction of rotation. The field winding 90 may be energized from any suitable source of direct current 93 through a current controlling resistance 94. To selectively energize armature members 91 and 92, I provide a pair of electric valve translating apparatus 95 and 96 which are associated with armature members 91 and 92, respectively. The electric valve translating apparatus 95 and 96 are arranged to transmit unidirectional current to armature members 91 and 92 and the armature members 91 and 92 are arranged to rotate motor 89 in opposite directions. The translating apparatus 95 and 96 may be energized from any suitable source of alternating current 97 and include electric valves 98, 99 and 100, 101, respectively. These electric valves are preferably of the type employing an ionizable medium and each includes an anode 102, a cathode 103 and a control member 104.

To impress on the control members 104 alternating voltages of predetermined phase displacement relative to the respective anode voltages, I employ a phase shifting circuit 105 which may be any of the forms known in the art. The phase shifting circuit 105 comprises a capacitance 106 and a resistance 107 and impresses alternating voltages on control members 104 which have a lagging phase displacement of substantially 90 electrical degrees relative to the respective anode voltages. A transformer 108 having a primary winding 109 and secondary windings 110 and 111 is connected between the phase shifting circuit 105 and control members 104 of electric valves 98—101. Secondary windings 110 and 111 are provided with electrical intermediate connections 112. A transformer 113 is connected to circuit 97 to supply current to heating elements of cathodes 103 of electric valves 98—101.

As an agency for controlling selectively the conductivities of electric valves 98, 99 and 100, 101 to effect control of the speed and the direction of rotation of motor 89, I provide resistances 114 and 115 which are associated with electric valves 98, 99 and 100, 101, respectively. The resistances 114 and 115 have a common juncture 116 and the terminals of the resistances are connected to the electrically intermediate connections 112 of secondary windings 110 and 111 of transformer 108. To control the current transmitted through resistances 114 and 115 in accordance with the speed and the direction of rotation of motor 89, I provide a pair of electronic discharge devices 117 and 118 which are preferably of the high vacuum type and each comprises an anode 119, a cathode 120 and a grid 121. The electronic discharge devices 117 and 118 transmit variable unidirectional currents through resistances 114 and 115 to impress variable unidirectional control potentials on control members 104 of electric valves 98–101, inclusive.

To supply unidirectional current to electronic discharge devices 117 and 118, and to supply a positive unidirectional biasing potential for control members 104 of electric valves 98—101, I employ circuits 122 and 123 respectively, each of which comprises a rectifier 124 and an electrical wave filter 125 including an inductance 126, a capacitance 127 and a resistance 128. The rectifiers 124 may be of the full wave type and may include elements of the dry surface contact type. A transformer 129 may be connected between circuits 122 and 123 and a suitable source of alternating current such as circuit 97. Transformer 129 is provided with secondary windings 130, 131 and 132. The secondary winding 132 is provided with an electrical intermediate connection 133. Secondary windings 130 and 131 energize rectifiers 124 of circuits 122 and 123, respectively. Secondary winding 132 energizes the heating elements for cathodes 120 of electronic discharge devices 117 and 118.

A pilot generator 134, having an armature member 135 and a field winding 136, is provided as an agency for producing a voltage which varies as the speed and the direction of rotation of motor 89 and may be mechanically coupled thereto. The pilot generator 134 may be of the direct current type. A bridge circuit 137 is connected to the armature terminals of the pilot generator 134 and may comprise linear resistances 138 and nonlinear resistances 139. The nonlinear resistances may be of the type described and claimed in the above mentioned patent of Karl B. McEachron.

A pair of damping circuits are connected between the field circuit of motor 89 and the grid circuits for electronic discharge devices 117 and 118. One of these damping circuits is associated with electronic discharge device 117 and comprises a capacitance 140 and a resistance 141, and the other is associated with discharge device 118 and comprises a capacitance 142 and a resistance 143. Resistances 141 and 143 are connected to the bridge circuit 137 and a common juncture 144 of these resistances is connected to the cathodes 120 of discharge devices 117 and 118 through a conductor 145 and through secondary winding 132 of transformer 129.

The operation of the embodiment of my invention shown in Fig. 7 will be explained by considering the arrangement when the machine 89 is operating as a direct current motor and when the system is arranged to effect control of the speed of machine 89 for either direction of rotation. If it be assumed that the armature member of motor 89 rotates in a clockwise direction when armature member 91 predominates, the control of the motor 89 is effected predominately by electric valves 98 and 99 which in turn are controlled by the electronic discharge device 117. For this direction of rotation, the pilot generator will produce a unidirectional voltage of a predetermined polarity such that the voltage impressed on grid 121 of discharge device 117 is positive. Discharge device 117 will conduct variable unidirectional currents through resistance 114, in accordance with speed variations of motor 89, to impress variable positive unidirectional potentials on control members 104 of electric valves 98 and 99. Circuit 122 impresses unidirectional voltages across the anodes and cathodes of electronic discharge devices 117 and 118 through resistances 114 and 115, and circuit 123 impresses positive unidirectional potentials on control members 104 of electric valves 98—101. Electronic discharge devices conduct variable amounts of unidirectional current through resistances 114 and 115 and thereby control the magnitude of the voltages appearing across the terminals thereof. The direction of these voltages is opposite to that produced by the rectifier 124 in circuit 123. Therefore, the resultant potentials impressed on control members 104 of electric valves 98—101 is the algebraic sum of the lagging quadrature component due circuit 105, the voltage produced by rectifier 124 of circuit 123 and the voltages appearing across the terminals of resistances 114 and 115.

If it be assumed that the speed of the motor 89 increases to a value above the value to be maintained, the output voltage of the pilot generator 134 will increase correspondingly and the voltage impressed on grid 121 of discharge device 117 will increase in a positive direction, effecting an increase in the unidirectional current transmitted through resistance 114. This increase in current occasions a decrease in the resultant positive unidirectional voltage impressed on control members 104 of electric valves 98 and 99 and ultimately effects a decrease in the voltage impressed on armature 91. By virtue of this decrease in armature voltage, the speed of the motor 89 will be restored to the desired value. On the other hand, if the speed decreases the system will respond in a similar manner to effect an increase in the voltage impressed on armature winding 91, tending to restore the motor speed to the desired value.

For counterclockwise rotation, the armature winding 92 predominates and the current for this winding is supplied by electric valves 100 and 101 which in turn are controlled by electronic discharge device 118. The operation for counterclockwise rotation is substantially the same as that explained above for clockwise rotation.

The damping circuits including capacitances 140 and 142 and resistances 141 and 143 operate to introduce compensating voltages in the grid circuits for electronic discharge devices 117 and 118 in accordance with the field voltage of motor 89. Sudden changes of field voltage cause currents to flow through resistances 141 and 143 which are the charging currents for capacitances 140 and 142, respectively. The polarities of the voltages appearing across the terminals of resistances 141 and 142 under the transient conditions will tend to modify or compensate for the voltage variations impressed on grids 121 by pilot generator 134, thereby preventing hunting of the motor 89.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a direct current motor having an excitation circuit and a pair of armature circuits, electric translating apparatus for selectively energizing said armature circuits and each comprising electric valve means associated with a different one of said armature circuits, said electric valve means each having a control member for controlling the conductivity thereof, means for controlling the speed and direction of rotation of said motor comprising a pair of electronic discharge devices each associated with a different one of said electric valve means for impressing control voltages on the control members and each comprising a grid, a direct current pilot generator responsive to the speed of said motor for producing an output voltage which varies in accordance with the speed of said motor, a bridge circuit connected to the output circuit of said pilot generator, and anti-hunting means connected between said bridge circuit and the grids of said electronic discharge devices for controlling the rate of change of the potential impressed on said grid.

2. In combination, a direct current motor having an excitation circuit and a pair of armature circuits, electric translating apparatus for selectively energizing said armature circuits and each comprising electric valve means connected to a different one of said armature circuits, said electric valve means each having a control member for controlling the conductivity thereof, means for impressing control voltages on the control members to control the speed and direction of rotation of said motor and comprising a pair of electronic discharge devices each connected to a different one of said control members, said electronic discharge devices each having a grid for determining the current conducted thereby, a direct current pilot generator for producing an output voltage responsive to the speed of said motor, a bridge circuit connected to said pilot generator for accentuating the variations in output voltage thereof, and anti-hunting means connected between said excitation circuit and said bridge circuit for controlling the rate of change of the potential impressed on the grids of said electronic discharge devices.

3. In combination, a direct current motor having an excitation circuit and having a pair of armature circuits, translating apparatus for selectively energizing said armature circuits and comprising a pair of electric valve means each associated with a different one of said armature circuits, said electric valve means each being provided with a control member for controlling the conductivity thereof, a pair of electronic discharge devices each associated with a different one of said electric valve means for impressing a control voltage on the associated control member and each comprising a grid for controlling the conductivities thereof, means for impressing on the grids voltages which vary in accordance with the speed of said motor, and means connected between said excitation circuit and said last mentioned means for controlling the rate of change of the potential of the grids.

4. In combination, a direct current motor having a field circuit and an armature member having a pair of circuits, electric translating apparatus for selectively energizing the armature circuits to effect rotation of said armature member in either direction and comprising a pair of electric valve means each associated with a different one of said armature circuits, each of said electric valve means being provided with a control member for controlling the conductivity thereof, a pair of electronic discharge devices for impressing on the control members of the electric valve means control potentials which vary in accordance with the speed of said motor, each of said devices being provided with a grid for controlling the conductivity thereof, a pilot generator for producing a voltage which varies in accordance with the speed of said motor and in accordance with the direction of rotation of said motor to effect selective control of the conductivities of the electronic discharge devices, and means connected between the excitation circuit and the grids to control the rate of change of the potentials of the grids.

GEORGE W. GARMAN.